(12) United States Patent
Addiego

(10) Patent No.: US 6,185,964 B1
(45) Date of Patent: Feb. 13, 2001

(54) SECURITY DEVICE TO PREVENT USE OF A MOUSE

(76) Inventor: Raphael Addiego, 1316 Basswood Cir., East Lansing, MI (US) 48823

( * ) Notice: Under 35 U.S.C. 154(b), the term of this patent shall be extended for 0 days.

(21) Appl. No.: 09/452,313

(22) Filed: Dec. 1, 1999

(51) Int. Cl.[7] .................................................. E05B 73/00
(52) U.S. Cl. ................................. 70/58; 70/63; 70/159; 248/551
(58) Field of Search .................................. 70/14, 18, 19, 70/57, 58, 63, 158–162; 248/551–553; 361/681, 685, 686, 732

(56) References Cited

U.S. PATENT DOCUMENTS

| | | | |
|---|---|---|---|
| 2,615,322 | * | 10/1952 | Gazda ................................. 70/159 X |
| 2,643,787 | * | 6/1953 | Rockman ............................. 70/57 X |
| 2,716,882 | * | 9/1955 | Gill et al. ............................. 70/57 X |
| 3,939,678 | * | 2/1976 | Wagoner .................................. 70/57 |
| 4,030,628 | * | 6/1977 | Hippert, Jr. ......................... 70/159 X |
| 4,311,883 | * | 1/1982 | Kidney .................................. 70/57 X |
| 4,446,708 | | 5/1984 | Ely . |
| 4,488,764 | | 12/1984 | Pfenning et al. . |
| 4,548,330 | * | 10/1985 | Hewitt et al. ...................... 70/160 X |
| 4,584,856 | | 4/1986 | Petersdorff et al. . |
| 4,585,202 | * | 4/1986 | Parsekian ............................. 70/58 X |
| 4,593,541 | * | 6/1986 | Hollis ...................................... 70/57 |
| 4,669,281 | * | 6/1987 | Young ..................................... 70/57 |
| 4,733,840 | * | 3/1988 | D'Amore ............................. 70/58 X |
| 4,884,420 | * | 12/1989 | Finkel et al. ............................. 70/58 |
| 4,890,769 | * | 1/1990 | Armstrong .......................... 70/159 X |
| 4,898,009 | | 2/1990 | Lakoski et al. . |
| 4,959,635 | | 9/1990 | Wilson . |
| 4,975,550 | | 12/1990 | Panchisin . |
| 4,987,836 | * | 1/1991 | Owen .................................... 70/63 X |
| 4,991,413 | * | 2/1991 | Arnaldo ............................. 70/162 X |
| 5,085,395 | * | 2/1992 | Frater et al. ......................... 70/58 X |
| 5,135,197 | * | 8/1992 | Kelley et al. ........................ 70/58 X |
| 5,268,809 | | 12/1993 | Eschenburg . |
| 5,660,451 | * | 8/1997 | Glynn ................................... 70/58 X |
| 5,709,110 | * | 1/1998 | Greenfield et al. ...................... 70/58 |
| 5,769,006 | * | 6/1998 | Allaer ................................... 70/63 X |
| 6,047,573 | * | 4/2000 | Martinez .............................. 70/63 X |

FOREIGN PATENT DOCUMENTS

| | | | |
|---|---|---|---|
| 163523 | * | 12/1985 | (EP) ......................................... 70/58 |
| 458721 | * | 11/1991 | (EP) ......................................... 70/63 |
| 2263260 | * | 7/1993 | (GB) ...................................... 70/158 |

* cited by examiner

*Primary Examiner*—Suzanne Dino Barrett
(74) *Attorney, Agent, or Firm*—Mary M. Moyne; Ian C. McLeod

(57) ABSTRACT

The present invention relates to a method and device for controlling the use of a computer (60). The invention calls for providing a container (100, 200 or 300) having a locking mechanism (122, 222 or 322) for holding the peripheral device (50) of the computer. The container can completely enclose the device which effectively prevents the use of the peripheral device. Alternatively, the device can merely prevent movement of the peripheral device over a surface such as in the case of a mouse.

18 Claims, 4 Drawing Sheets

SECURITY DEVICE TO PREVENT USE OF A MOUSE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

(1) Field of the Invention

The present invention relates to a method for controlling the use of a peripheral device for a computer through use of a lockable container which holds the peripheral device. In particular, the present invention relates to a method for controlling the use of a computer by preventing the use of the mouse to operate the computer.

(2) Description of the Related Art

Since the explosion of the home computer and the dangers of the Internet, parents have been trying to prevent their children from accessing the computer and particularly, the Internet when the parents are not at home. Since the use of the Windows® operating system has become standard, the need for a mouse or track ball to gain access to and easily navigate through a computer has become essential. The mouse or track ball is also a necessity to allow for navigation through the Internet. Therefore, one way to prevent unauthorized use of the computer is to prevent use of the mouse or track ball needed to access the computer. The present invention achieves that goal in a simple and inexpensive way.

The related art has shown various devices to prevent the use of a computer or to prevent tampering with a computer. Illustrative are U.S. Pat. Nos. 4,446,708 to Ely; 4,898,009 to Lakoski et al; 4,975,550 to Panchisin and 5,268,809 to Eschenbura.

Ely describes a locking cover which is mounted over the keypad to prevent unauthorized use of the keypad. This invention is intended to be used for push-button telephone keyboards. However, the cover could also be used with computer keyboards.

Lakoski et al describes a device which mounts over the back panel of a computer to prevent access to the computer through the back panel. The device also prevents tampering with the cables and connection ports at the back of the computer.

Panchisin describes a security device which conceals the keyboard actuator of a computer. The device has a key activated switch which activates and deactivates the computer.

Eschenburg describes a protection device which mounts in the access opening of a diskette drive of a computer. The device prevents the insertion of a diskette into the drive.

Also, of interest is U.S. Pat. No. 4,959,635 to Wilson which describes a lock for preventing the removal of a peripheral device from a computer. The lock does not prevent the use of the peripheral device.

Only of minimal interest are U.S. Pat. Nos. 4,488,764 to Pfenning et al and 4,584,856 to Petersdorff et al. Pfennina et al shows a security container which mounts around the plug of an electrical cord. The plug can be placed within the container to prevent the plug from being plugged into an electrical outlet. Petersdorff et al describes a cover to prevent unauthorized access to a telephone jack.

There remains the need for a lockable container which can be placed around a peripheral device for a computer to prevent use of the peripheral device and the computer.

SUMMARY OF THE INVENTION

The present invention relates to a method and device for controlling the use of a computer. The invention calls for providing a lockable container for holding the peripheral device of the computer. The container can completely enclose the device which effectively prevents the use of the device. Alternatively, the container can merely prevent movement of the device over a surface such as in the case of the mouse. Failure of the mouse to move over a surface effectively prevents use of the mouse. The container can have a variety of sizes and shapes as necessary to accommodate different peripheral devices.

The present invention relates to a method for controlling the use of a peripheral device for a computer which comprises: providing a lockable and unlockable container having a base and a lid with a sidewall extending therebetween, the lid being configured to be attached to the base; and means for locking the lid on the base wherein in use, the peripheral device is placed between the base and the lid in an inner chamber of the container and the lid is locked to prevent access to and use of the peripheral device; inserting the peripheral device in the unlocked container; locking the container to prevent access to the peripheral device; unlocking the container to provide access to the peripheral device and removing the peripheral device from the container; and accessing the computer through the peripheral device which has been removed from the container, wherein access to the use of the peripheral device and the computer is controlled by the lockable and unlockable container.

Further, the present invention relates to a method for preventing the use of a peripheral device for a computer which comprises: providing a container having a base with a lid configured to be connected to the base such that the base and lid form an inner chamber in the container and means for locking the lid in a closed position on the base; positioning the peripheral device in the inner chamber of the container; moving the lid into the closed position such that the peripheral device is in the inner chamber of the container; and locking the lid in the closed position to prevent access to the peripheral device.

Still further, the present invention relates to a device for controlling the use of a peripheral device having a cord for connecting to a computer which comprises: a base having opposed ends and a first surface extending therebetween; a lid having opposed ends with a first surface extending therebetween and configured to be attached to the base such that one end of the base is adjacent one end of the lid and the first surface of the base is spaced apart from the first surface of the lid; a sidewall having an opening and extending between the first surface of the base and the first surface of the lid wherein when the lid is in a closed position, the base, lid and sidewall form a container having an inner chamber; and means for locking the lid on the base in the closed position wherein in use, the peripheral device is placed between the first surface of the base and the first surface of the lid in the inner chamber of the container with the cord extending through the opening in the container and the lid is moved into and locked in the closed position to control access to and use of the peripheral device.

The substance and advantages of the present invention will become increasingly apparent by reference to the following drawings and the description.

DESCRIPTION OF THE PREFERRED EMBODIMENTS

Figure 1:
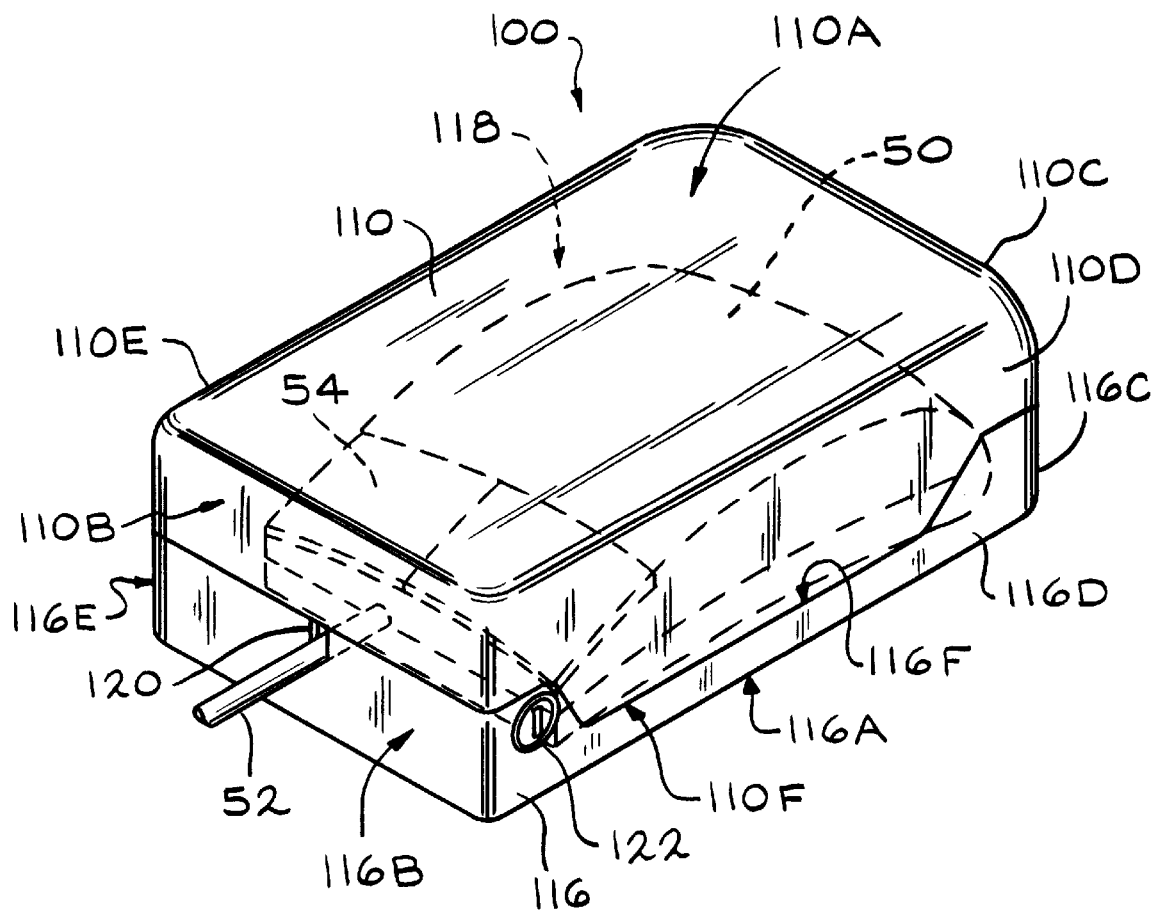
FIG. 1 is a perspective view of the container 100 of the first embodiment having the mouse 50 located in the inner chamber 118 of the container 100.
Figure 3:
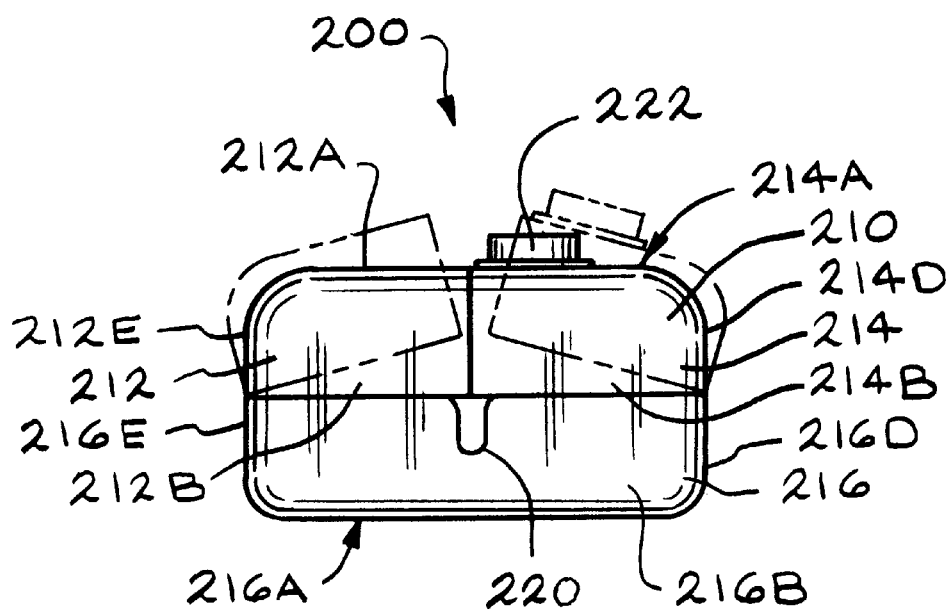
FIG. 3 is an end view of the container 200 of the second embodiment.
Figure 4:
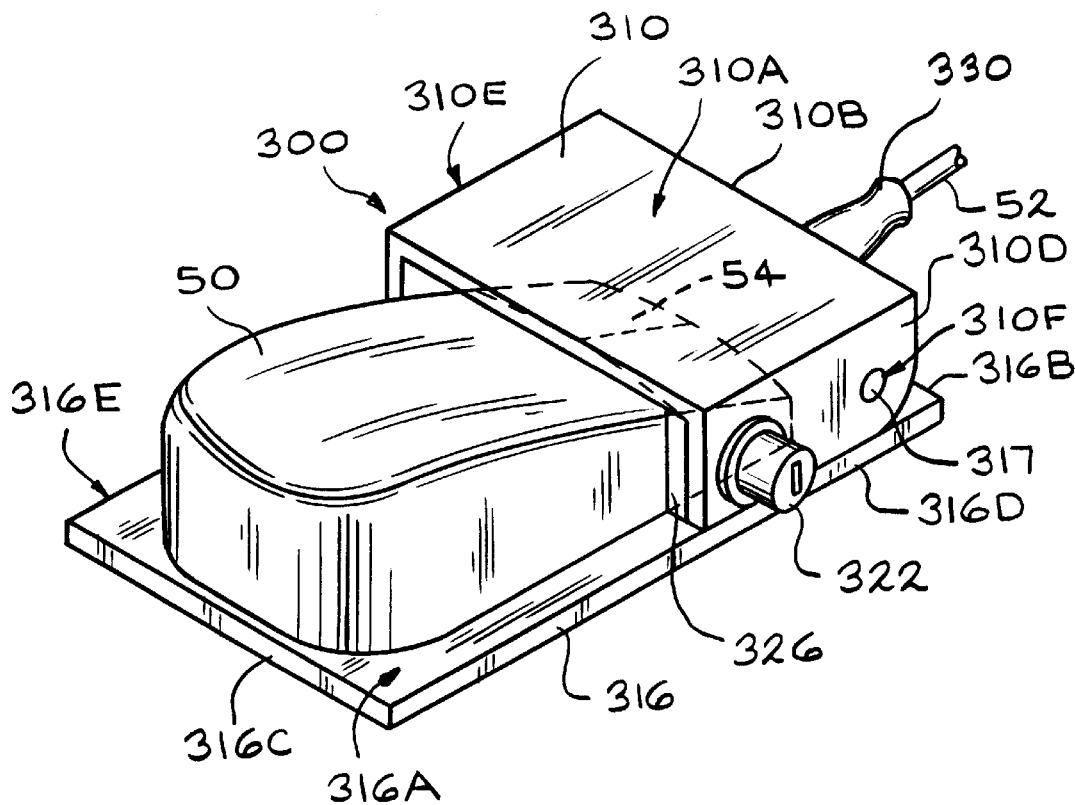
FIG. 4 is a perspective view of the container 300 of the third embodiment.

FIGS. 1, 3 and 4 show three (3) embodiments of the container 100, 200 or 300 of the present invention. In all of the embodiments, the container 100, 200 or 300 is preferably for use with a standard mouse 50. However, the container 100, 200 or 300 could also be used with an optical tracking mouse (not shown) such as the INTELLIMOUSE® EXPLORER® manufactured by Microsoft Corporation, a wireless mouse (not shown), a gyroscopic mouse (not shown) or a game controller (not shown). It is understood that the container 100, 200 and 300 could have a variety of shapes to accommodate different sized mouse 50 and different sizes and types of track balls or other peripheral devices. In the first embodiment, the container 100 preferably has a rectangular shape with an upper portion or lid 110 and a lower portion or base 116. The lid 110 includes a top wall 110A with opposed end walls 110B and 110C and opposed sidewalls 110D and 110E extending downward therefrom. The base 116 includes a bottom wall 116A with end walls 116B and 116C and the sidewalls 116D and 116E extending upward therefrom. When the lid 110 is secured on the base 116 in the closed position, the top wall 110A of the lid 110 is spaced apart from the bottom wall 116A of the base 116 with opposed end walls 116B and 116C and opposed sidewalls 116D and 116E of the lid 110 and base 116 extending therebetween forming an inner chamber 118 (FIG. 1).

Figure 2:
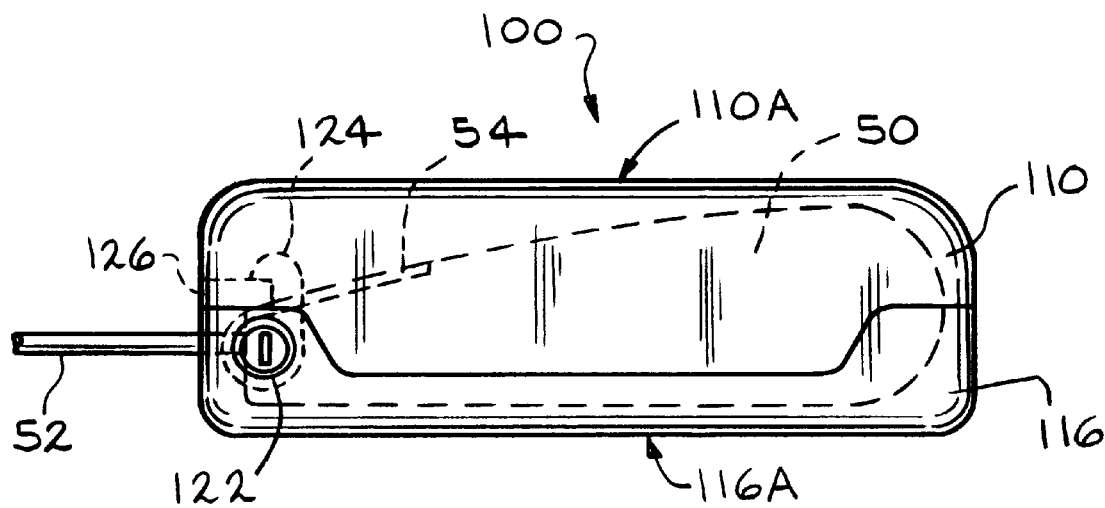
FIG. 2 is a side view of the container 100.

In the first embodiment, the lid 110 is preferably completely removable from the base 116. Alternatively, the lid 110 is pivotably connected to the base 116 along one end wall 110B or 110C by a hinge (not shown). Preferably, one end wall of the base 116 is provided with a slot 120 which allows the cord 52 for the mouse 50 to exit the container 100 without being damaged. Alternatively, one end wall 110B or 110C of the lid 110 is provided with the slot. In the preferred embodiment, one of the sidewalls 116D of the base 116 is provided with an indention 116F and the corresponding sidewall 110D of the lid 110 is provided with an extension 110F which mates with the indention 116F in the sidewall 110D of the base 116 (FIG. 2). The indention 116F allows for easier access to and removal of the mouse 50 from the container 100 when the lid 110 is removed or in the open position. In the preferred embodiment, the base 116 is provided with a locking mechanism 122 at one end. The locking mechanism 122 is preferably key activated. Rotating the key 54 in the locking mechanism 122 preferably rotates a latch 124 which contacts a protrusion 126 on the lid 110 and acts to lock the lid 110 in the closed position on the base 116 to prevent access to the peripheral device 50 in the inner chamber 118 of the container 100. Any well known locking mechanism may be used. For example, the lock could be a combination lock.

The container 200 of the second embodiment, is similar to the container 100 of the first embodiment having a base 216 and a lid 210 (FIG. 3). The base 216 of the second embodiment is similar or identical to the base 116 of the first embodiment. The lid 210 however is divided into a left section 212 and a right section 214. Each section 212 and 214 preferably includes half of each end wall 212B or 214B, one sidewall 212E or 214D and half of the top wall 212A or 214A of the lid 210. The sidewall 212E or 214D of each section 212 or 214 is preferably pivotably mounted to the sidewall 216D or 216E of the base 216 by a hinge (not shown). The left and right sections 212 and 214 of the lid 210 are preferably identical except that one section 214 of the lid 210 is provided with the latch (not shown) of the locking mechanism 222 and the other section 212 of the lid 210 is provided with the protrusion (not shown) which is contacted by the latch to hold the sections 212 and 214 of the lid 210 in the locked, closed position. In this embodiment, the sections 212 and 214 of the lid 210 are preferably not removable from the base 216.

Figure 5:
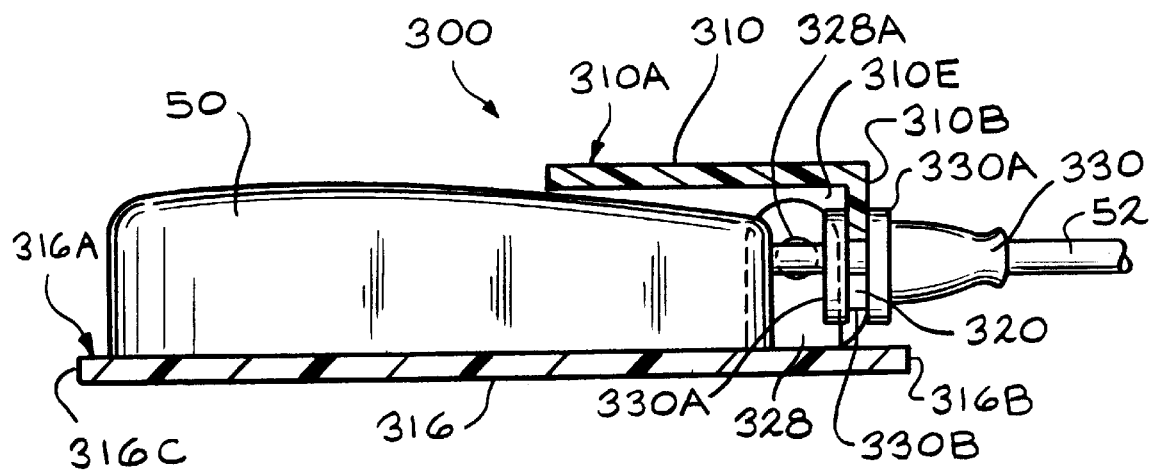
FIG. 5 is a cross-sectional view of the container 300 of the third embodiment.

In the third embodiment, the container 300 includes an upper portion or lid 310 and a lower portion or base 316 (FIG. 4). The lid 310 preferably includes a top wall 310A, an end wall 310B and opposed sidewalls 310D and 310E. The base 316 preferably includes only a bottom wall, 316A having opposed ends 316B and 316C and opposed sides 316D and 316E. The lid 310 is preferably pivotably mounted at one end 316B of the base 316. The lid 310 is preferably mounted to the base 316 by pins 317 which extend through holes 310F in the sidewalls 310D and 310E of the lid 310 adjacent the end wall 310B and through holes 328A in brackets 328 which extend upward from the base 316 adjacent the sidewalls 310D and 310E of the lid 310. The brackets 328 are preferably located adjacent the inner surface of the sidewalls 310D and 310E of the lid 310 (FIG. 5). The container 300 of the third embodiment is preferably used with a mouse 50. In this embodiment, the lid 310 only extends over a portion of the length of the base 316. The length of the lid 310 is such that when the mouse 50 is correctly positioned in the container 300, and the lid 310 is in the closed position, the lid 310 extends over the keys 54 of the mouse 50 and prevents use of the mouse 50. The container 300 could be used with a track ball; however, the lid 310 would need to be of a length to cover both the keys and the ball. Any access to the ball would allow a user to rotate the ball and thus, use the track ball. A locking mechanism 322 is provided in the sidewall 310D or 310E of the lid 310. The locking mechanism 322 can be of any well known type. The locking mechanism 322 preferably includes a latch (not shown) which is rotated to engage a protrusion 326 mounted to the base 316 to lock the lid 310 in the closed position. In this embodiment, the end wall 310B of the lid 310 is provided with a slot 320 which allows the cord 52 of the mouse 50 to extend through the end wall 310B of the lid 310. The cord 52 of the mouse 50 is preferably provided with a gasket 330 having enlarged ends 330A with a groove 330B between the ends 330A (FIG. 5). The cord 52 is preferably mounted in the slot 320 such that the groove 330B of the gasket 330 is mounted in the slot 320 and the enlarged ends 330A of the gasket 330 are preferably adjacent each side of the end wall 310B of the lid 310. The gasket 330 is preferably in a fixed position on the cord 52. Thus, the mounting of the gasket 330 in the slot 320 prevents the cord 52 from being pulled through the slot 320. This prevents the mouse 50 from being removed from the container 300. In an alternative embodiment (not shown), a gripper is provided in the slot 320 such that when the cord 52 is extended through the gripper and the lid 310 is moved into the closed position, the cord 52 for the mouse 50 is unable to be moved in the slot 320. Therefore, the mouse 50 is unable to be removed from the container 300 without opening the lid 310. In an alternative third embodiment, the cord 52 is preferably permanently extended through the slot 320 in the lid 310 of the container 300. In one (1) alternative embodiment, when the lid 310 is in the open position, the gripper releases the cord 52 such that the cord 52 is able to slide freely in the opening in the container 300. This enables a user to move the mouse 50 out of the container 310 to use the mouse 50. The lid 310 of the container 300 could also be removable to allow for complete removal of the mouse 50 and cord 52 from the container 300.

Figure 6:
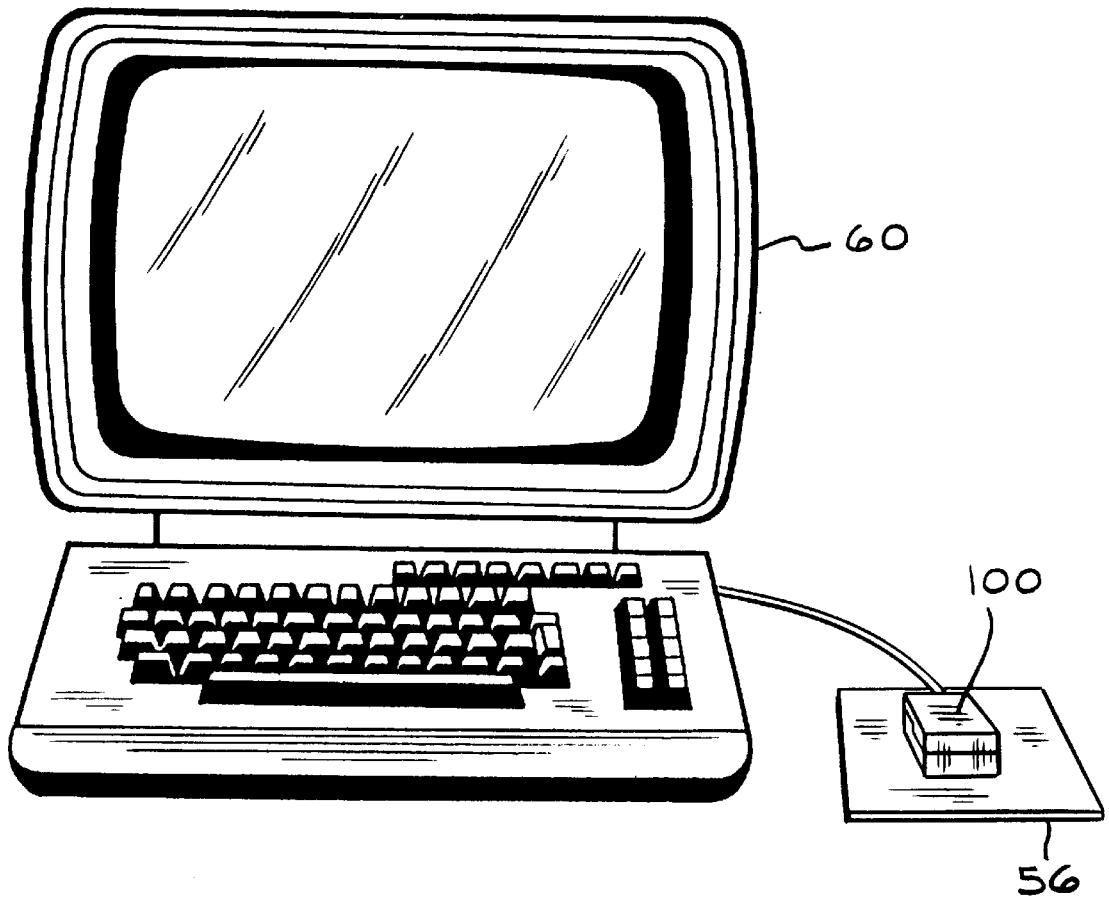
FIG. 6 is a schematic view of the container 100 of the first embodiment mounted to a mouse pad 56 adjacent a computer 60.

In all embodiments, the container 100, 200 or 300 is preferably of a size to easily fit a standard size mouse. A standard size mouse 50 has a length of approximately 4.5 inches (11.4 cm), a width of about 2.5 inches (6.4 cm) and a height of about 1.5 inches (3.8 cm). The container 100, 200 or 300 preferably has a length of about 5.0 inches (12.7 cm), a width of about 3.0 inches (7.6 cm) and a height of about 2.0 inches (5.1 cm). The container 100, 200 or 300 is preferably constructed of a lightweight, inexpensive material. In the preferred embodiment, the container 100, 200 or 300 is free standing and able to be placed anywhere. However, the container 100, 200 or 300 could also be permanently mounted, for example, on the desk adjacent the computer 60 or mounted on the mouse pad 56 (FIG. 6). The container 100, 200 or 300 when mounted to the desk could also prevent theft of the mouse 50 particularly with using a wireless mouse. In an alternative embodiment (not shown), the container is mounted on a surface and is locked to a surface. In this embodiment, the bottom wall of the base of the container has an opening which mounts over a plug extending upward from the surface. When the lid of the container is moved into the closed position, the plug extends through an opening in the lid. The end of the plug is then provided with a locking mechanism to keep the lid in the closed position.

IN USE

The device and method of the present invention prevents unauthorized use of a computer 60 by controlling the use of a peripheral device such as any type of mouse 50, track ball or game controller. To use the container 100, 200 or 300 of all the embodiments, the lid 110, 210 or 310 of the container 100, 200 or 300 is moved into the open position. In the first embodiment, preferably, when the lid 110 is in the open position, the lid 110 is completely removed from the base 116. In the remaining embodiments, the lid 210 or 310 is preferably pivoted into the open position while remaining attached to the base 216 or 316. Next, the mouse 50 or track ball is positioned on the base 116, 216 or 316 of the container 100, 200 or 300 on the bottom wall 116A, 216A or 316A. In the third embodiment, the mouse 50 is positioned on the base 316 such that the front of the mouse 50 having the buttons 54 and the cord 52 is adjacent the end 316B of the base 316 having the lid 310. The cord 52 of the mouse 50 or track ball is then placed in the slot 120, 220 or 320 in the end wall 116B, 216B or 316B of the base 116 or 216 or lid 310. The lid 110, 210 or 310 is then moved into the closed position. The locking mechanism 122, 222 or 322 is then activated to lock the lid 110, 210 or 310 in the closed position. When the container 100, 200 or 300 is locked, an unauthorized user is unable to gain access to the mouse 50 to use the mouse 50 either by moving the mouse 50 or clicking the buttons on the mouse 50. In the third embodiment, the position of the keys 54 of the mouse 50 under the lid 310 prevents use of the keys 54 of the mouse 50. In addition, the gasket 330 or gripper fixes the cord 52 of the mouse 50 in place in the opening preventing the unauthorized user from moving the mouse 50 from beneath the closed lid 310 such that the keys 54 are accessible. In all embodiments, when the container 100, 200 or 300 is locked, the unauthorized user is unable to push the buttons 54 on the mouse 50 and is unable to move the mouse 50 along a surface. Thus, an unauthorized user is unable to operate the mouse 50 while it is in the container 100, 200 or 300. Since the unauthorized user is unable to use the mouse 50, the unauthorized user is unable to access the computer 60 or easily navigate through the computer 60.

It is intended that the foregoing description be only illustrative of the present invention and that the present invention be limited only by the hereinafter appended claims.

I claim:

1. A method for controlling the use of a peripheral device for a computer which comprises:
    (a) providing a lockable and unlockable container having a base and a lid with a sidewall extending therebetween, the lid being configured to be attached to the base; and means for locking the lid on the base wherein in use, the peripheral device is placed between the base and the lid in an inner chamber of the container and the lid is locked to prevent access to and use of the peripheral device;
    (b) inserting the peripheral device in the unlocked container;
    (c) locking the container to prevent access to the peripheral device;
    (d) unlocking the container to provide access to the peripheral device and removing the peripheral device from the container; and
    (e) accessing the computer through the peripheral device which has been removed from the container, wherein access to the use of the peripheral device and the computer is controlled by the lockable and unlockable container.

2. The method of claim 1 wherein the peripheral device is a mouse having buttons and wherein in step (b), the peripheral device is positioned in the container such that when the lid is locked, the lid covers the buttons and prevents use of the buttons.

3. The method of claim 1 wherein the sidewall has an opening and wherein in step (b), the peripheral device is positioned in the container such that a cord of the peripheral device extends through the opening in the sidewall.

4. A method for preventing the use of a peripheral device for a computer which comprises:
    (a) providing a container having a base with a lid configured to be connected to the base such that the base and lid form an inner chamber in the container and means for locking the lid in a closed position on the base;

(b) positioning the peripheral device in the inner chamber of the container;

(c) moving the lid into the closed position such that the peripheral device is in the inner chamber of the container; and (d) locking the lid in the closed position to prevent access to the peripheral device.

5. The method of claim 4 wherein the peripheral device is a mouse having buttons and wherein in step (b), the peripheral device is positioned in the container such that when the lid is moved into the closed position, the lid covers the buttons and prevents use of the buttons.

6. The method of claim 4 wherein the container has a sidewall with an opening extending between the lid and the base and wherein in step (b), the peripheral device is positioned in the container such that a cord of the peripheral device extends through the opening in the sidewall.

7. A device for controlling the use of a computer which comprises:

(a) a peripheral device having a cord and adapted to be connected to the computer; and (b) a lockable and unlockable container having
  (i) a base having opposed ends and a first surface extending therebetween;
  (ii) a lid having opposed ends with a first surface extending therebetween and configured to be attached to the base such that one end of the base is adjacent one end of the lid and the first surface of the base is spaced apart from the first surface of the lid;
  (iii) a sidewall having an opening and extending between the first surface of the base and the first surface of the lid wherein when the lid is in a closed position, the base, lid and sidewall form an inner chamber of the container; and
  (iv) means for locking the lid on the base in the closed position, wherein to control the use of the computer, the peripheral device is connected to the computer and placed between the first surface of the base and the first surface of the lid in the inner chamber of the container with the cord extending through the opening in the sidewall and the lid is moved into and locked in the closed position such that the peripheral device is unable to be used to control access to and use of the computer.

8. The device of claim 7 wherein the peripheral device is a mouse with the cord adjacent a lower surface of the mouse and the container is of a size and shape to completely surround the mouse and the opening in the sidewall is adjacent the base to allow the cord for the mouse to extend out of the container.

9. The device of claim 7 wherein one end of the base is attached to one end of the lid.

10. The device of claim 7 wherein a length of the lid is less than a length of the base such that a portion of the inner chamber of the container is accessible when the lid is in the closed position, wherein the sidewall adjacent the end of the lid attached to the end of the base is provided with the opening, the opening having a gripping means for fixably mounting the cord of the peripheral device and wherein the gripping means prevents the cord of the peripheral device from sliding and moving in the opening which prevents the peripheral device from being removed from the inner chamber of the container.

11. The device of claim 10 wherein the gripping means is mounted on the cord of the peripheral device.

12. The device of claim 7 wherein the lid and base have an equal length and width such that the inner chamber of the container is completely enclosed when the lid is in the closed position.

13. The device of claim 7 wherein the base has sides extending between the ends and the lid has a first portion and a second portion, each portion having opposed ends with sides extending therebetween, wherein the portions are mounted to the base such that the ends of the portions are adjacent the ends of the base with one side of the first portion pivotably connected to one side of the base and one side of the second portion pivotably connected to the other side of the base and wherein in the closed position, the other sides of the portions are adjacent each other.

14. The device of claim 7 wherein the peripheral device is a mouse having buttons and wherein the lid is of such a length as to extend beyond the buttons of mouse, when the mouse is correctly positioned in the inner chamber of the container and the lid is in the closed position to prevent use of the buttons.

15. The device of claim 7 wherein the means for locking is a key activated lock.

16. The device of claim 8 wherein the mouse has a length of about 4.5 inches (11.4 cm), a width of about 2.5 inches (6.4 cm) and a height of about 1.5 inches (3.8 cm) and wherein the container has a length of about 5.0 inches (12.7 cm), a width of about 3.0 inches (7.6 cm) and a height of about 2.0 inches (5.1 cm).

17. The device of claim 7 wherein the container is mounted on a surface adjacent the computer.

18. The device of claim 1 wherein the container is mounted on a mouse pad.

* * * * *